United States Patent [19]

Tsuchie et al.

[11] 4,230,212
[45] Oct. 28, 1980

[54] REAR HUB FOR A BICYCLE

[75] Inventors: Kimihiro Tsuchie; Takafumi Harada, both of Sakai, Japan

[73] Assignee: Shimano Industrial Company, Limited, Osaka, Japan

[21] Appl. No.: 957,019

[22] Filed: Nov. 2, 1978

[30] Foreign Application Priority Data

Nov. 17, 1977 [JP] Japan .......................... 52/154896[U]

[51] Int. Cl.³ ...................... B62M 9/12; F16D 41/12; F16H 55/30
[52] U.S. Cl. ...................................... 192/64; 474/160
[58] Field of Search .......... 74/217 B, 243 R, 243 DR; 192/64

[56] References Cited

U.S. PATENT DOCUMENTS

| 3,900,088 | 8/1975 | Ozaki | 192/64 |
| 4,047,603 | 9/1977 | Ozaki | 192/64 |
| 4,102,215 | 7/1978 | Nagano et al. | 74/243 DR |
| 4,124,107 | 11/1978 | Kine | 192/64 |
| 4,154,123 | 5/1979 | Nagano | 192/64 |

Primary Examiner—Allan D. Herrmann
Attorney, Agent, or Firm—Stevens, Davis, Miller & Mosher

[57] ABSTRACT

A rear hub for a bicycle, in which a cylindrical bearing member is mounted to a hub shell axially outwardly of one of flanges thereof, the cylindrical member is provided at its outer periphery with a plurality of first and second engaging grooves extending axially of the cylindrical member, at least one connector insertable into the first engaging grooves connects a plurality of sprockets with spacers so as to form a multi-stage sprocket assembly, and each sprocket at the assembly holds pawls in mesh with the second engaging grooves respectively, so that the assembly may be detachably mounted to the cylindrical bearing member.

8 Claims, 9 Drawing Figures

REAR HUB FOR A BICYCLE

This invention relates to a rear hub for a bicycle, and more particularly to a rear hub comprising a hub shaft fixed to the bicycle frame, a hub shell rotatably supported to the hub shaft through a pair of bearings, and a multi-stage sprocket assembly mounted to one axial end of the hub shell.

Generally, in this kind of rear hub the multi-stage sprocket assembly comprises an inner cylindrical member, an outer cylindrical member carrying a plurality of sprockets, a pair of bearings supporting the outer member freely rotatably with respect to the inner member, and a one-directional transmission. There are two well-known types of multi-stage sprocket assembly, one in which an inner member is previously integrated with the hub shell and one in which a separate inner member is screw connected with the hub shell through screw means provided at the inner member.

When spokes of the rear wheel are mounted to hub flanges at both axial ends of the hub shell, the sprocket assembly of separate type is removed from the hub shell and then the rear hub is readily spoked, but it is difficult to spoke a hub having a sprocket assembly previously integrated therewith. The reason is that sprockets at the assembly are usually larger in diameter than the hub flanges and the largest diameter sprocket is positioned next to the hub flange, the larger sprockets making it difficult to mount the spokes to the hub flange.

Removal of sprockets from the outer member mounted to the hub shell can eliminate the above drawback. However, in the sprocket assembly which is integrated with the hub shell the inner member is integrated with the hub shell, the outer member is rotatably supported to the inner member through a pair of bearings, a one-directional transmission is inserted between the inner and outer members, and the sprockets are supported through spacers therebetween and are fixed to the outer member by means of fixing means. Therefore, the outer member is not so readily removable from the inner member, and when remounted after removal, the outer member must have its rotation adjusted with respect to the inner member. On the other hand, each sprocket and spacer should be removed independently, thereby taking much time for removal of the assembly. As a result, as a practiced matter the aforesaid spoke mounting problems remain unsolved.

The invention has been designed to remedy the spoke mounting drawbacks to the rear hub whose sprocket assembly is previously integrated with a cylindrical bearing member provided at the hub shell. An object of the invention is to provide a rear hub for a bicycle in which the sprocket assembly is removable from the cylindrical bearing member in one action without dismantling the assembly to thereby facilitate spoking of the rear hub.

Another object of the invention is to provide a rear hub which omits the conventional outer member and which is simple in construction, light in weight and inexpensive to produce, and which is further suitable for a drive whose sprockets rotate following the rear wheel rotation even without cranking during the bicycle's running to thereby change the speed.

The rear hub of the invention is constructed with a cylindrical bearing member mounted to the hub shell axially outwardly of one of hub flanges thereof, the cylindrical bearing member is provided at its outer periphery with a plurality of first and second engaging grooves extending axially of the same, at least one connector is insertable into the first engaging grooves to connect a plurality of sprockets with spacers to form a multi-stage sprocket assembly, and each of the sprockets holds pawls engageable with the second engaging grooves, so that the assembly may detachably be mounted to the cylindrical bearing member.

The invention is characterized in that first, the sprockets are connected together with the spacers by means of the connectors to form a multi-stage sprocket assembly; second, the multi-stage sprocket assembly is detachably mounted to the cylindrical bearing member; and third, each of the sprockets holds pawls in place of the conventional outer member, in other words, the sprockets are supported directly to the cylindrical bearing member in relation of being one-directionally rotatable therewith.

Accordingly, the bicycle wheel is easily spoked to the hub by removing the multi-stage sprocket assembly as a whole from the cylindrical bearing member in one action without dismantling the assembly. Also, the conventional outer cylindrical member carrying the sprockets is unnecessary, thereby reducing the number of parts and making the hub light weight and inexpensive. Furthermore, each sprocket is provided with pawls so as to be supported directly to the cylindrical bearing member in relation of being one-directionally rotatable, whereby mounting means for coupling the assembly with the cylindrical bearing member can set a rotary resistance to the sprocket at a desired value. Consequently, the rear hub is most suitable for the drive of the so-called front free system, in which the front gear is freely rotatable.

These and other objects and novel features will be more apparent from the following description of an embodiment of the invention in accordance with the accompanying drawings, in which.

Figure 1:
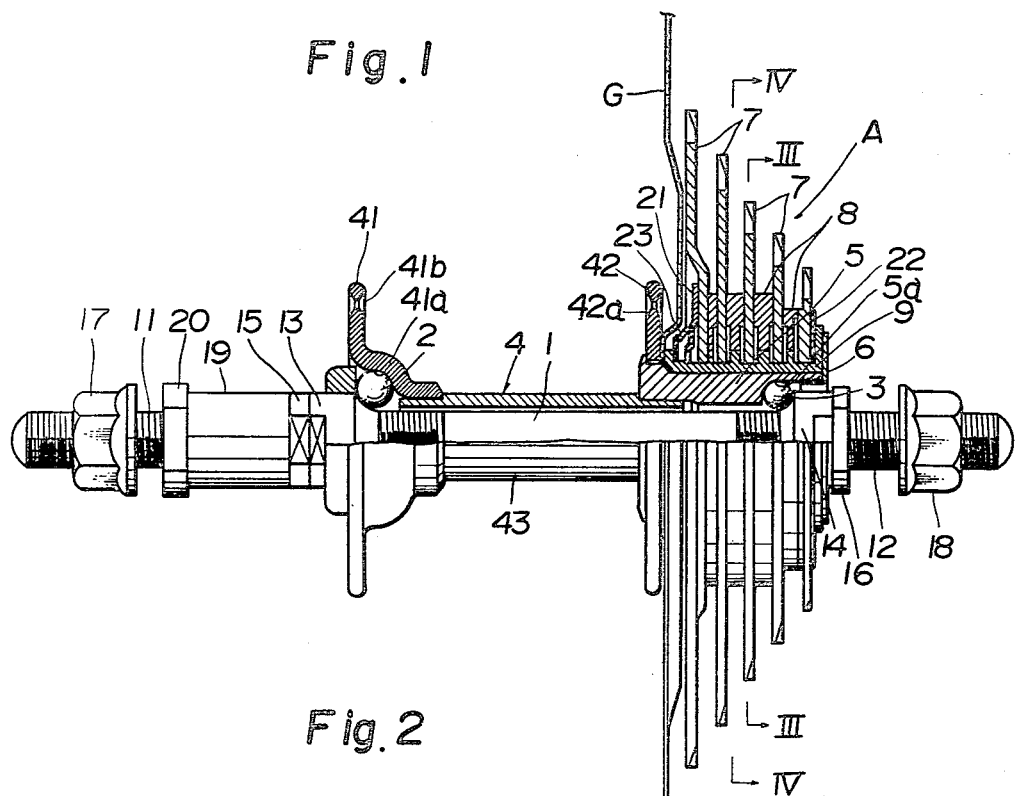
FIG. 1 is a partially cutaway front view of the embodiment of the invention.

The hub of the invention, as shown in FIG. 1, generally comprises a hub shaft 1 fixed to the bicycle frame (not shown), a pair of bearings 2 and 3, consisting mainly of balls, a hub shell 4 having a pair of hub flanges 41 and 42 and rotatably supported to the bearings 2 and 3, and a multi-stage sprocket assembly A mounted to the hub shell 4 axially outwardly of one hub flange 42 thereof.

The multi-stage sprocket assembly A constructed as described hereinafter is mounted detachably to a cylindrical bearing member 5 provided at the hub shell 4 axially outwardly of the hub flange 42.

The hub shaft 1 has at the outer peripheries of both axial ends thereof screw threads 11 and 12 screwable with ball holders 13 and 14 constituting the ball bearings 2 and 3, with lock nuts 15 and 16 fixing the ball holders 13 and 14 to the hub shell 4, and with tightening nuts for securing the hub shaft 1 to the bicycle frame. In addition, a spacer 19 is screwed with the hub shaft 1 at the left side thereof in FIG. 1, and a lock nut 20 is screwed thereagainst.

The hub shell 4 in the embodiment shown in FIG. 1, comprises a tubular body 43 and the hub flanges 41 and 42 separate therefrom. The hub flange 41 at the left side in FIG. 1 is pressed onto the left end of body 43 and flange 42 at the right side is pressed onto the right end. The left side hub flange 41 is provided at its inner periphery with a ball race 41a and the cylindrical bearing member 5 is provided at its inner periphery at the axially outside, i.e., the right side in FIGS. 1 and 2, with a ball race 5a, so that the hub shell 4 is rotatably supported to the hub shaft 1 through the ball bearings 2 and 3. Also, the hub flanges 41 and 42 have bores 41a and 42a for receiving therein spokes of the rear wheel. In addition, the cylindrical bearing member 5 may, rather than being separated from the hub shell 4, be integrated therewith. In short, it is enough that the cylindrical member be provided at the hub shell 4 so as to project axially outwardly of the hub flange 42.

Figure 2:
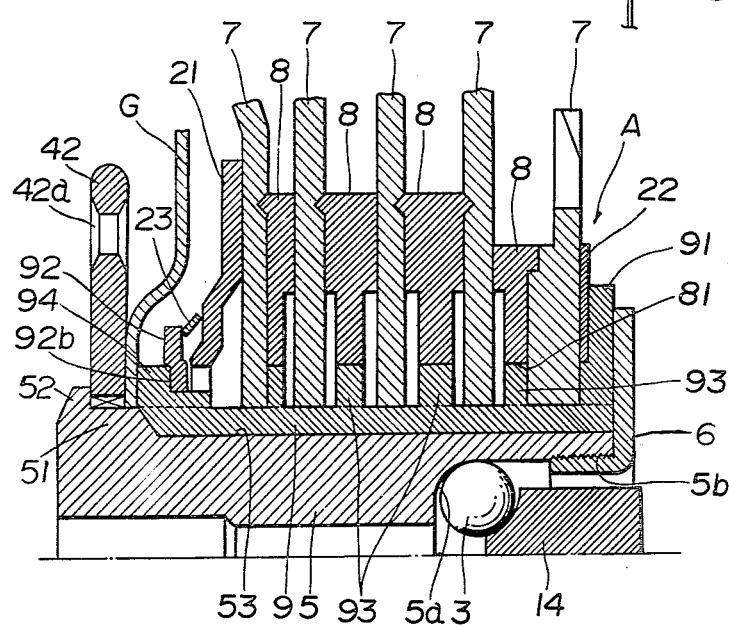
FIG. 2 is an enlarged sectional view of a part thereof.

The cylindrical member 5 is axially long enough to carry the number of sprockets used in the multi-stage sprocket assembly A and is provided: at the axially inner end, i.e., the left end in FIGS. 1 and 2, with a portion 51 having a flange 52 and carrying the hub flange 42; at the outer periphery with a plurality of first and second grooves (three each are shown) axially extending and being circumferentially spaced at regular intervals respectively; and at the inner periphery of the axially outer end, i.e., the right end in FIGS. 1 and 2, with a screw thread 5b screwable with a holder 6 through which the multi-stage sprocket assembly A to be hereinafter described is coupled with the cylindrical bearing member 5.

Next, the multi-stage sprocket assembly A mounted detachably to the cylindrical bearing member 5 will be described.

The assembly A comprises a plurality of sprockets 7 (five sprockets are shown) of different diameters, a plurality of spacers 8 (four spacers are shown) keeping the sprockets 7 spaced at regular intervals, and at least one of connector 9 (three connectors are shown) having stoppers 91 and an annular holding plate 92 for assembling the sprockets through the spacers 8, whereby the sprockets 7 are rotatably and the spacers 8 are non-rotatably supported to the connectors 9 respectively. Besides this, the assembly A, as shown in FIGS. 1 and 2, has a first and a second annular cover 21 and 22 and a spring 23 urging the sprockets 7 toward the stoppers 91 of the connectors 9.

The connectors 9 are rod-like shaped to fit to the first engaging grooves 53 respectively. Each of the connectors 9, as shown in section in FIG. 6, has a thickness equal to the depth of each of the grooves 53 and is curved at the outer surface identically with the outer periphery of the cylindrical bearing member 5.

Figure 5:
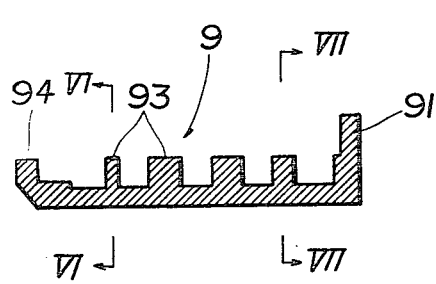
FIG. 5 is a sectional view of a connector.

At a lengthwise intermediate portion of each connector 9 are provided a plurality of engaging projections 93 corresponding to the number of spacers 8 (four projections are shown) extending perpendicularly outwardly with respect to the longitudinal direction of the same. At one axial end of the connector 9 opposite to the stopper 91, i.e., the left end in FIGS. 1, 2 and 5, is provided an engaging nose 94 for holding the holding plate 92 against axial and circumferential movement.

Figure 6:
FIG. 6 is a sectional view taken on Line VI—VI in FIG. 5.
Figure 7:
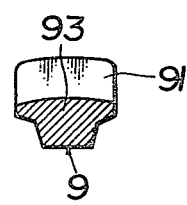
FIG. 7 is a sectional view taken on Line VII—VII in FIG. 5.

The engaging projections 93, as shown in FIGS. 6 and 7, are widthwise enlarged at tops thereof to be insertably engaged with cutouts 81 provided at the spacers 8 to be hereinafter described, so that the spacers 8 may be non-rotatably connected to the connectors 9 respectively.

Figure 8:
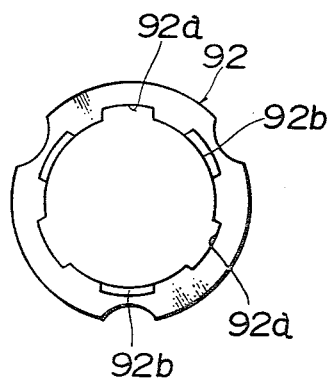
FIG. 8 is a front view of a holding plate.
Figure 9:
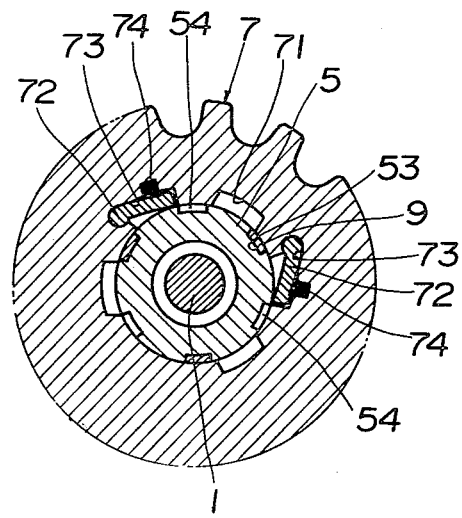
FIG. 9 is an illustration of transmitting pawls in receding condition.

The aforesaid holding plate 92, as shown in FIG. 8, comprises an annular plate and is provided at the inner periphery with cutouts 92a and recesses 92b. The engaging noses 94, which are equal in width to the connectors 9, can pass through the cutouts 92a. The recesses 92b are circumferentially spaced from the cutouts 92a at regular intervals and receive therein the engaging noses 94 respectively, whereby the holding plate 92 is inserted onto the connectors 9 through the cutouts 92a and then turned at a given angle to be insertably engaged with the noses 94 through the recesses 92b.

Figure 3:
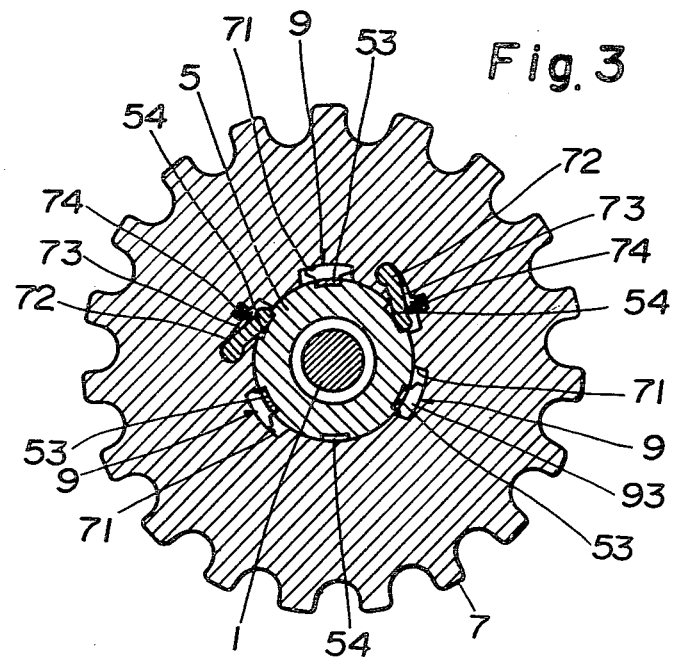
FIG. 3 is a sectional view taken on Line III—III in FIG. 1.

Each of the sprockets 7, as shown in FIG. 3, has a central bore of a diameter slightly larger than the outer diameter of the cylindrical bearing member 5, the central bore having at its inner periphery cutouts 71 through which the engaging noses 94 are passable and recesses 73 for accommodating transmitting pawls 72 to be hereinafter described. The transmitting pawls 72 engage with the second engaging grooves 54 at the cylindrical bearing member 5 to thereby transmit torque to the cylindrical bearing member 5 from each sprocket 7 when normally rotating, and are kept within the grooves 73 and always urged by pawl springs 74 to be engaged with the second engaging grooves 54 respectively.

Figure 4:
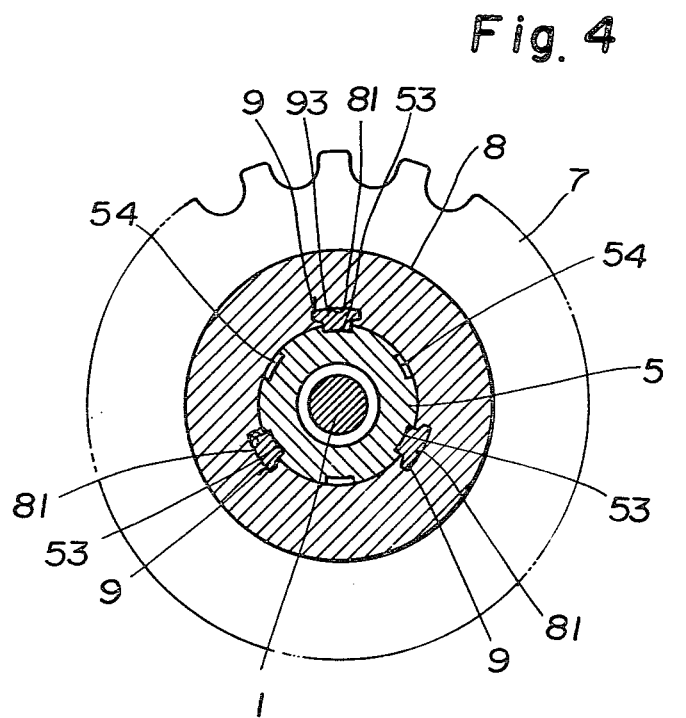
FIG. 4 is a sectional view taken on Line IV—IV in FIG. 1.

The spacers 8, as shown in FIG. 4, have central bores of diameters equal to or larger than those of the central bores at the sprockets 7 respectively. The central bores at the spacers 8 have at the inner peripheries thereof cutouts 81 in engagement with the projections 93 at the connectors 9 respectively.

The multi-stage sprocket assembly A is constructed by use of a tool of a size equal to the cylindrical bearing member 5 and of two kinds of engaging grooves identical therewith. The tool aims at facilitating assembly of the sprockets and is not important for the invention.

Assembly is carried out as follows: first, the connectors 9 are inserted into the grooves of the tool, the second cover 22 and the minimum diameter sprocket 7 are inserted onto the cylindrical bearing member 5 until the former abuts against the stoppers 91 at the connectors 9; next, one of the spacers 8 is inserted onto the tool and is fit at the cutouts 81 to the projections 93 of the connectors 9 and then other sprockets 7 and spacers 8 are inserted in sequence; finally, the first cover 21 and holding plate 92 are inserted and the spring 23 is inserted therebetween. After all the members are inserted, the tool is taken off. In addition, the first and second covers 21 and 22 are made annular and abut against the outermost sprockets of maximum and minimum diameters so as to prevent the pawls 72 from escaping axially of the sprockets, thereby making the assembly A simple in construction. However, the covers are not inevitably necessary when an anti-pawl-escape means is provided at both the outermost sprockets 7.

The spring 23 urges the sprockets 7 toward the stopper 91 of each connector 9, whereby the sprockets 7, which are rotatably supported thereto, are subjected to a rotary resistance when freely rotating. Hence, the prescribed urging force of spring 23 is set to apply to each sprocket a desirable rotary resistance. Accordingly, the rear hub of the invention is applicable most suitably for the drive of the so-called front free system, in which the front gear is supported to the crank shaft for rotation in one direction. In other words, sprockets having a rotary resistance larger than that of the front gear in free rotation are used together with the front gear to thereby constitute the so-called front free system drive.

In detail, the urging force of spring 23 is selected to increase a rotary resistance of each of the sprockets 7 more than that of the front gear in free rotation, so that the cylindrical bearing member 5, which rotates together with the hub shell 4 during the bicycle's forward running, may transmit its rotation to the sprockets 7 and rotate integrally therewith. Hence, the sprockets 7 rotate even without cranking as long as the bicycle is running forward, whereby the chain travels to change the speed through a speed control device.

Also, the rotary resistance value is made smaller than the force acting on the sprocket 7 when any foreign object is caught between the chain and the sprocket 7 rotating together with the cylindrical bearing member 5. In other words, when the chain is subjected to a force greater than the rotary resistance value, the sprockets 7 become free with respect to the cylindrical bearing member 5, thereby allowing the latter only to rotate and securing safety in the bicycle's running. In addition, the spring 23, which is made of a punched ring-like shaped spring steel and bent in wave form, may be replaced by a coiled spring.

The multi-stage sprocket assembly A constructed as described is detachably mounted to the cylindrical bearing member 5 in such a manner that the connectors 9 are fit into the first engaging grooves 53 at the cylindrical bearing member 5 respectively, the assembled sprockets 7 are slidably inserted onto the cylindrical bearing member 5 while the pawls 72 at each sprocket 7 are fit into the second engaging grooves 54 at the cylindrical bearing member 5 respectively, and the holder 6 is screwed to a screw thread 5b provided at the inner periphery of the cylindrical bearing member 5.

In addition, the holder 6 may be screwed to a screw thread provided at the outer periphery of cylindrical bearing member 5, or may be replaced by a snap ring to fasten the assembly A. The holder 6 also serves to prevent the assembly A from escaping from the cylindrical bearing member 5, but its construction is not particularly defined.

The multi-stage sprocket assembly A is mounted to the cylindrical member 5 so that the rear hub of the invention is completed. Each of the sprockets 7 is supported for rotation in one direction with respect to the cylindrical bearing member 5 under the predetermined rotary resistance and normally rotates by pedalling to transmit the driving force to the cylindrical bearing member 5 through the pawls 72, thereby rotating the rear wheel for driving the bicycle forward.

When a cyclist stops pedalling, the pressure-contact resistance of pawls 72 against the second engaging grooves 54 and rotary resistance of the spring 23 transmit the rotation of rear wheel to the sprockets 7, whereby the latter are rotated together with the cylindrical bearing member 5.

As a result, the sprockets 7 rotate to allow the chain to travel in mesh therewith, whereby the rear hub when used together with the one-directionally freely rotatable front gear performs a speed change even without pedalling during the bicycle's running.

Furthermore, in a case that the chain is jammed between the front gear and the bicycle frame so as to be restricted from travelling or any foreign object is caught between the front gear and the chain, the pawls 72 are pushed by edges of the second engaging grooves 54 so as to recede within the grooves 73 against the pawl springs 74 respectively. Hence, the pawls 72 are disconnected from the cylindrical bearing member 5, whereby the cylindrical bearing member 5 rotates independently of the sprockets 7. As a result, a stoppage of the chain travel applies no abrupt braking action to the cylindrical bearing member, i.e., the rear wheel, thereby securing safety in the bicycle's running.

When spokes of the rear wheel are mounted to the hub flanges 41 and 42, the multi-stage sprocket assembly A is removed from the cylindrical bearing member 5 by unscrewing the holder 6, so that the rear hub may be spoked without hindrance. When the assembly A, is removed the sprockets and spacers do not become separated. Also, the assembly A is readily remounted after the spoking operations is finished, thereby improving as a whole the efficiency of the spoking work.

As clearly understood from the aforesaid description, the rear hub of the invention can remove a plurality of sprockets from the cylindrical bearing member in one action, whereby the rear hub is spoked very easily and efficiently. Also, there is no need for a conventional outer member to be used, and the sprockets are supported directly to the cylindrical bearing member, whereby the rear hub of the invention reduces the number of parts and is light in weight and inexpensive to produce.

Furthermore, the hub of the invention is appliable to a drive including a freely rotatable front gear. In other words, the plurality of sprockets have pawls in engagement with the second engaging grooves at the cylindrical bearing member and are urged toward the stoppers by the spring, whereby a rotary resistance of each sprocket can be set to a given value, thus making the rear hub most suitable for the freely rotatable front gear drive.

While a preferred embodiment of the invention has been disclosed, it is to be understood that it is merely exemplary of the invention and that other forms might be adopted, all coming within the scope of the claims which follow.

What is claimed is:

1. A rear hub for a bicycle comprising:
   (a) a hub shaft;
   (b) a pair of bearings;
   (c) a hub shell rotatably supported to said hub shaft through said bearings, said hub shell being provided at both axial ends thereof with a pair of hub flanges and with a cylindrical bearing member extending axially outwardly of one of said hub flanges, said cylindrical bearing member having at its outer periphery a plurality of first engaging grooves and a plurality of second engaging grooves, both said first and second grooves extending axially of said cylindrical bearing member;
   (d) a multi-stage sprocket assembly comprising: a plurality of different diameter sprockets, a plurality of spacers for keeping said sprockets spaced at regular intervals, and at least one connector for connecting said sprockets through said spacers and for rotatably supporting said sprockets, said connector having a rod-like shape and being insertable into one of said first engaging grooves, said connector being provided at its lengthwise intermediate portion with a plurality of engaging projections which engage with said spacers and support said spacers non-rotatably with respect to said connector, at its one lengthwise end with a stopper for restraining said sprockets and spacers from moving in one axial direction of said connector, and at its other lengthwise end with an annular holding plate, said holding plate serving to restrain said sprockets and spacers from moving in the other axial direction of said connector and being detachably mounted with respect to said connector, each of said sprockets having a central bore fit onto said cylindrical bearing member, said central bore having at its inner periphery pawls in mesh with said second engaging grooves of said cylindrical bearing member respectively; and (e) mounting means for detachably mounting said multi-stage sprocket assembly to said cylindrical bearing member.

2. The rear hub for the bicycle according to claim 1, wherein each said connector of said multi-stage sprocket assembly has a thickness equal to the depth of said first engaging grooves at said cylindrical bearing member and is curved at its outer periphery identically to parts of the outer periphery of said cylindrical bearing member when said connector is fit into a said first engaging groove.

3. The rear hub for the bicycle according to claim 1, wherein said stopper at one axial end of each said connector provided in said multi-stage sprocket assembly extends radially outwardly more than said engaging projections at an intermediate portion of each said connector, each said connector being provided at the other said end with engaging means for receiving therein said annular holding plate to prevent its axial and circumferential movement.

4. The rear hub for the bicycle according to claim 3, wherein said engaging means comprise engaging noses extending integrally with and outwardly of each said connector respectively, said holding plate being provided at its inner periphery with cutouts through which said engaging noses pass and with recesses in respective engagement with said engaging noses.

5. The rear hub for the bicycle according to claim 1, further comprising a spring inserted between said holding plate of said multi-stage sprocket assembly and one of said sprockets opposite to said holding plate for urging each of said sprockets toward said stopper.

6. The rear hub for the bicycle according to claim 1, further comprising a first annular cover inserted between said holding plate and one of said sprockets opposite to said holding plate and a second annular cover inserted between said stopper and one of said sprockets opposite thereto.

7. The rear hub for the bicycle according to claim 6, further comprising a spring inserted between said holding plate and said first cover for urging each of said sprockets toward said stopper.

8. The rear hub for the bicycle according to claim 1, wherein said mounting means comprises, a threaded cylinder, a holder comprising an annular flange extending radially outwardly from one axial end of said threaded cylinder, and a screw thread provided at the inner periphery of said cylindrical bearing member.

* * * * *